United States Patent
Diab et al.

(10) Patent No.: US 8,305,955 B2
(45) Date of Patent: Nov. 6, 2012

(54) METHOD AND SYSTEM FOR NETWORK SYNCHRONIZATION VIA A FEMTOCELL

(75) Inventors: Wael William Diab, San Francisco, CA (US); Charles Abraham, Los Gatos, CA (US); Xuemin Sherman Chen, Rancho Santa Fe, CA (US); Vinko Erceg, Cardiff, CA (US); Victor T. Hou, La Jolla, CA (US); Jeyhan Karaoguz, Irvine, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 717 days.

(21) Appl. No.: 12/395,470

(22) Filed: Feb. 27, 2009

(65) Prior Publication Data

US 2010/0220692 A1 Sep. 2, 2010

(51) Int. Cl.
*H04B 7/212* (2006.01)
(52) U.S. Cl. ......... 370/324; 370/350; 370/503; 455/502
(58) Field of Classification Search .................. 370/350, 370/503, 520, 324, 328, 331; 455/435.1, 455/502, 422, 507, 343.2; 342/357.09
See application file for complete search history.

(56) References Cited

U.S. PATENT DOCUMENTS

| | | | | |
|---|---|---|---|---|
| 5,231,632 A * | 7/1993 | Yamao et al. | ................. | 370/331 |
| 5,434,787 A * | 7/1995 | Okamoto et al. | ............. | 701/475 |
| 6,477,154 B1 * | 11/2002 | Cheong et al. | ................ | 370/328 |
| 6,542,754 B1 * | 4/2003 | Sayers et al. | ................... | 455/502 |
| 6,754,513 B1 * | 6/2004 | Ilg | ................................. | 455/574 |
| 7,302,269 B1 | 11/2007 | Crawford et al. | | |
| 2002/0039371 A1 | 4/2002 | Hedayat et al. | | |
| 2006/0119505 A1 * | 6/2006 | Abraham | ................. | 342/357.09 |
| 2006/0209795 A1 | 9/2006 | Chow et al. | | |
| 2007/0025739 A1 * | 2/2007 | Moore et al. | .................. | 398/202 |
| 2007/0121655 A1 | 5/2007 | Jin | | |
| 2007/0189184 A1 | 8/2007 | Ryu et al. | | |
| 2008/0216145 A1 | 9/2008 | Barton et al. | | |
| 2008/0244148 A1 | 10/2008 | Nix, Jr. et al. | | |

(Continued)

FOREIGN PATENT DOCUMENTS

WO 2007/000455 1/2007

OTHER PUBLICATIONS

U.S. Appl. No. 12/391,009, filed Feb. 23, 2009.

(Continued)

*Primary Examiner* — Andrew Lai
(74) *Attorney, Agent, or Firm* — Sterne, Kessler, Goldstein & Fox, PLLC

(57) ABSTRACT

Aspects of a method and system for communication are provided. In this regard, a femtocell may receive messages from a plurality of different sources comprising one or more other femtocells, one or more cellular enabled communication devices, and one or more non-cellular network nodes. The femtocell may select, based on the received messages, a master clock within one of the plurality of different sources as a master clock for synchronization of the plurality of different sources. A femtocell clock, a global navigational satellite signal (GNSS) clock, a cellular base station clock, or a cellular enabled communication device clock may be selected as the master clock. The femtocell may transmit and/or receive synchronization messages to and/or from the one or more cellular enabled communication devices and the one or more non-cellular network nodes.

20 Claims, 7 Drawing Sheets

U.S. PATENT DOCUMENTS

| | | |
|---|---|---|
| 2008/0287153 A1* | 11/2008 | Fullam .................... 455/502 |
| 2009/0042536 A1 | 2/2009 | Bernard et al. |
| 2009/0061873 A1 | 3/2009 | Bao et al. |
| 2009/0092081 A1 | 4/2009 | Balasubramanian et al. |
| 2009/0098858 A1 | 4/2009 | Gogic |
| 2009/0164547 A1 | 6/2009 | Ch'ng |
| 2009/0221261 A1* | 9/2009 | Soliman .................... 455/343.2 |
| 2009/0279430 A1 | 11/2009 | Huber et al. |
| 2009/0288144 A1 | 11/2009 | Huber et al. |
| 2009/0292799 A1 | 11/2009 | Eisener et al. |
| 2009/0316649 A1 | 12/2009 | Chen |
| 2010/0167734 A1 | 7/2010 | Jones et al. |
| 2010/0182991 A1 | 7/2010 | Abraham et al. |
| 2010/0184411 A1 | 7/2010 | Chen et al. |
| 2010/0184414 A1 | 7/2010 | Abraham et al. |
| 2010/0184423 A1 | 7/2010 | Kent et al. |
| 2010/0184450 A1 | 7/2010 | Chen et al. |
| 2010/0186027 A1 | 7/2010 | Hou et al. |
| 2010/0210239 A1 | 8/2010 | Karaoguz et al. |
| 2010/0220642 A1 | 9/2010 | Abraham et al. |
| 2010/0220692 A1 | 9/2010 | Diab et al. |
| 2010/0220731 A1 | 9/2010 | Diab et al. |
| 2010/0222054 A1 | 9/2010 | Abraham et al. |
| 2010/0222069 A1 | 9/2010 | Abraham et al. |
| 2010/0238836 A1 | 9/2010 | Diab et al. |

OTHER PUBLICATIONS

U.S. Appl. No. 12/406,835, filed Mar. 18, 2009.
U.S. Appl. No. 12/395,410, filed Feb. 27, 2009.
U.S. Appl. No. 12/395,383, filed Feb. 27, 2009.
U.S. Appl. No. 12/395,313, filed Feb. 27, 2009.
U.S. Appl. No. 12/395,436, filed Feb. 27, 2009.
European Search Report corresponding to European Patent Application No. 10001341.6-1244, dated Jul. 5, 2010.

* cited by examiner

METHOD AND SYSTEM FOR NETWORK SYNCHRONIZATION VIA A FEMTOCELL

CROSS-REFERENCE TO RELATED APPLICATIONS/INCORPORATION BY REFERENCE

Not Applicable

FIELD OF THE INVENTION

Certain embodiments of the invention relate to networking. More specifically, certain embodiments of the invention relate to a method and system for network synchronization via a femtocell.

BACKGROUND OF THE INVENTION

A femtocell may be placed in a customer's residence or in a small business environment, for example. Femtocells may be utilized for off-loading macro radio network facilities, improving coverage locally in a cost-effective manner, and/or implementing home-zone services to increase revenue. Femtocells, like macro base stations, may be enabled to connect "standard" phones to a cellular provider's network by a physical broadband connection which may be a digital subscriber line (DSL) connection and/or a cable connection, for example. Since the traffic between a customer's premises femtocell equipment and the operator's network may be traversing a public network, the traffic may be prone to various risks Communication between femtocells and one or more cellular provider's networks enables operation in private and public areas. The capacity of a femtocell may be adequate to address a typical family use model supporting two to four simultaneous voice calls and/or data, for example.

An important characteristic of femtocells is their ability to control access. In an open access scenario, any terminal and/or subscriber may be allowed to communicate with the femtocell. Accordingly, the femtocell usage may somewhat resemble that of a macrocellular system. In a closed access scenario, the femtocell may serve a limited number of terminals and/or subscribers that may be subscribed to a given cellular base station. In this regard, the cellular base station may be perceived as being deployed for private usage.

A regulatory issue with regard to femtocells is that they use licensed frequencies that radiate at a very low power in a controlled environment. It may be likely that they may not require a license from a local authority, as macrocellular base stations do. An additional regulatory issue may arise from the relationship between a femtocell operator and a broadband services operator. One possible scenario may include the broadband operator being unaware of the existence of a femtocell operator. Conversely, the broadband operator and femtocell operator may have an agreement or they may be the same operator, for example. Interference between femtocells may be an issue for femtocell deployments based on wideband technologies such as WCDMA, for example, because initial operator deployments may use the same frequency for both the femtocell and the macrocellular networks or due to the proximity of femtocell base stations in dense urban areas There are a plurality of design models for deployment and integration of femtocells, for example, an IP based Iu-b interface, a session initiation protocol (SIP) based approach using an Iu/A interface, use of unlicensed spectrum in a technique known as unlicensed mobile access (UMA) and/or use of IP multimedia subsystem (IMS) voice call continuity (VCC), for example.

In an Iu-b model based femtocell deployment approach, femtocells may be fully integrated into the wireless carrier's network and may be treated like any other remote node in a network. The Iu-b protocol may have a plurality of responsibilities, such as the management of common channels, common resources, and radio links along with configuration management, including cell configuration management, measurement handling and control, time division duplex (TDD) synchronization, and/or error reporting, for example. In Iu-b configurations, mobile devices may access the network and its services via the Node B link, and femtocells may be treated as traditional base stations.

In a SIP based femtocell deployment approach, a SIP client, embedded in the femtocell may be enabled to utilize SIP to communicate with the SIP-enabled mobile switching center (MSC). The MSC may perform the operational translation between the IP SIP network and the traditional mobile network, for example.

In a UMA based femtocell deployment approach, a generic access network (GAN) may offer an alternative way to access GSM and GPRS core network services over broadband. To support this approach, a UMA Network Controller (UNC) and protocols that guarantee secure transport of signaling and user traffic over IP may be utilized. The UNC may be enabled to interface into a core network via existing 3GPP interfaces, for example, to support core network integration of femtocell based services by delivering a standards based, scalable IP interface for mobile core networks.

In an IMS VCC based femtocell deployment approach, VCC may provide for a network design that may extend an IMS network to include cellular coverage and address the handoff process. The IMS VCC may be designed to provide seamless call continuity between cellular networks and any network that supports VoIP, for example. The VCC may also provide for interoperability between GSM, UMTS, and CDMA cellular networks and any IP capable wireless access network, for example. The IMS VCC may also support the use of a single phone number or SIP identity and may offer a broad collection of functional advantages, for example, support for multiple markets and market segments, provisioning of enhanced IMS multimedia services, including greater service personalization and control, seamless handoff between circuit-switched and IMS networks, and/or access to services from any IP device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for network synchronization via a femtocell, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for network synchronization via a femtocell. In various embodiments of the invention, a femtocell may receive messages from a plurality of different sources comprising one or more other femtocells, one or more cellular enabled communication devices, and one or more non-cellular network nodes. The femtocell may select, based on the received messages, a master clock within one of the plurality of different sources as a master clock for synchronization of the plurality of different sources.

One or more of the devices may be operable to receive GNSS signals or one or more GNSS devices may be communicatively coupled to femtocell and/or one or more of the plurality of different sources. The femtocell may communicate an indication of the selected master clock to the other femtocells, the one or more cellular enabled communication devices, and/or the one or more non-cellular network nodes. A femtocell clock, a global navigational satellite signal (GNSS) clock, a cellular base station clock, or a cellular enabled communication device clock may be selected as the master clock. The received messages may comprise an indication of received GNSS signals strength of the femtocell, the one or more cellular enabled communication devices, and the one or more non-cellular network nodes. The master clock may be selected based on received GNSS signal strength. A clock within the femtocell may be selected to be the master clock when received signal strength of GNSS signals in the femtocell is above a threshold. A clock within one of the cellular enabled communication devices may be selected to be the master clock when received signal strength of GNSS signals the femtocell and the other femtocells is below a threshold and received signal strength of GNSS signals in the cellular enabled communication devices is above threshold.

The master clock may be selected based on clock jitter, clock skew, clock accuracy, and/or clock drift. A clock in one of the one or more of cellular enabled communication devices may be selected as the master clock based on received signal strength in the femtocell from each of the one or more cellular enabled communication devices. In an exemplary embodiment of the invention, a clock within the femtocell may be selected as the master clock and the femtocell may subsequently transmit synchronization request messages simultaneously, or nearly simultaneously, to the one or more cellular enabled communication devices and to the one or more non-cellular network nodes. The femtocell may transmit and/or receive synchronization messages to and/or from the one or more cellular enabled communication devices and the one or more non-cellular network nodes. The synchronization message may comprise a timestamp generated by the femtocell and the timestamp may correspond to a time instant at which the synchronization message was transmitted or received by the femtocell.

Figure 1A:
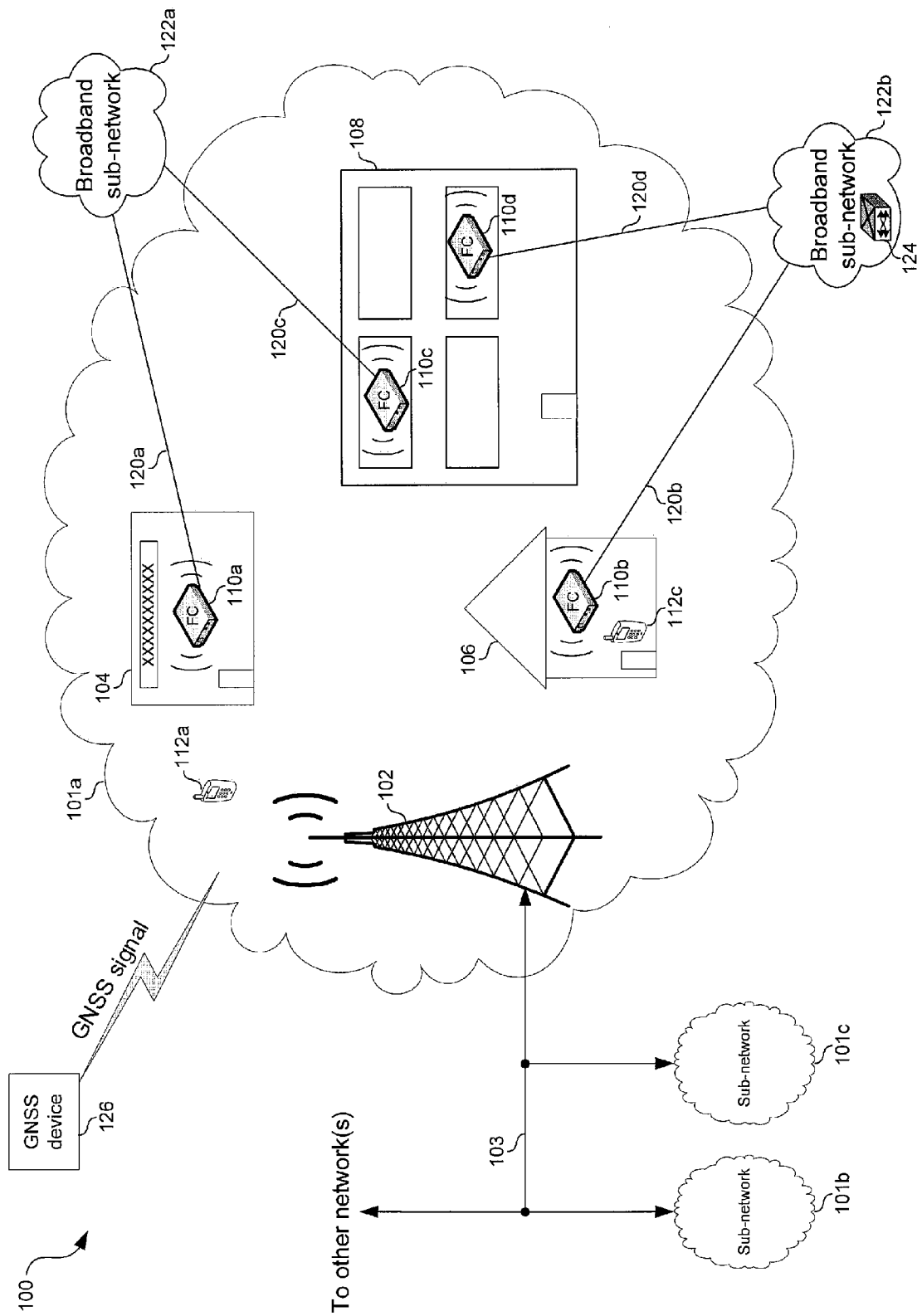
FIG. 1A is a diagram illustrating an exemplary cellular network, in accordance with an embodiment of the invention.

FIG. 1A is a diagram illustrating an exemplary communication system, in accordance with an embodiment of the invention. Referring to FIG. 1A, there is shown cellular sub-networks 101a-101c, and broadband sub-networks 122. The exemplary sub-network 101a may comprise a base station 102, femtocells 110a-110d, which are collectively referred to herein as femtocells 110, and cellular enabled communication devices 112a and 112c, which are collectively referred to herein as cellular enabled communication devices 112. The femtocells 110 may be installed in one or more commercial properties 104, one or more residential properties 106, and/or one or more multi-tenant properties 108.

The broadband sub-networks 122a and 122b, collectively referred to herein as sub-networks 122, may comprise, for example, satellite networks, cable networks, DVB networks, the Internet, or similar local or wide area networks, which are capable of conveying data which may comprise multimedia. The broadband connections 120a-120d, collectively referred to herein as broadband connections 120, may comprise optical, wired, and/or wireless links. A broadband sub-networks may comprise one or more non-cellular network nodes 124.

The non-cellular network node 124 may comprise, for example, a server, network switch, router, and/or computer. Exemplary communication protocols which may be utilized by the node 124 comprise WiMax, Ethernet, Wi-Fi, DSL, T1/E1, and/or DVB. In various embodiments of the invention, the non-cellular network node 124 may be the last network node traversed by multimedia content destined for a femtocell 110 and ultimately for a cellular enabled communication devices 112.

The GNSS device 126 may comprise suitable logic, circuitry, and/or code operable to generate and/or transmit GNSS signals. Exemplary GNSS devices comprise GLONASS, GPS, and GALILEO satellites and also assisted GPS (AGPS) servers or other assisted GNSS technologies.

The commercial properties 104 may comprise, for example, stores, restaurants, offices, and municipal buildings. The residential properties 106 may comprise, for example, single-family homes, home offices, and/or town-houses. Multi-tenant properties 108 may comprise, for example, residential and/or commercial tenants such as apartments, condos, hotels, and/or high rises. One or more of the commercial properties 104, residential properties 106, and/or multi-tenant properties 108 may comprise computing and/or multimedia networks which may comprise a set-top-box with integrated femtocell functionality.

The base station 102 may be operable to communicate data wirelessly utilizing one or more cellular standards such as IS-95, CDMA, GSM, TDMA, GPRS, EDGE, UMTSN-VCDMA, TD-SCDMA, HSDPA, extensions thereto, and/or variants thereof. "Data," as utilized herein, may refer to any analog and/or digital information including but not limited to voice, Internet data, and/or multimedia. Multimedia may comprise audio and/or visual content comprising, video, still images, animated images, and/or textual content. The base station 102 may communicate with cellular enabled communication devices such as the cellular enabled communication devices 112. Exemplary cellular standards supported by the base station 102 may be specified in the International Mobile Telecommunications-2000 (IMT-2000) standard and/or developed by the $3^{rd}$ generation partnership project (3GPP) and/or the $3^{rd}$ generation partnership project 2 (3GPP2). The base station 102 may communicate data amongst the various components of the sub-network 101a. Additionally, data communicated to and/or from the base station 102 may be communicated to sub-network 101b, sub-network 101c, and/or to one or more other networks (not shown) via one or more backhaul connections 103. In this manner, data communicated to and/or from the base station 102 may be communicated to and/or from, other portions of the system 100 and/or other networks. Exemplary networks with which data may be communicated may comprise public switched telephone networks (PSTN) and/or IP networks such as the Internet or an intranet. In some instances, the base station 102 may comprise one or more clocks and may be operable to communicate a state or time of that clock to cellular enabled communication devices with which it communicates.

The femtocell 110 may each comprise suitable logic, circuitry, and/or code that may be operable to process and/or communicate data adhering to one or more cellular standards such as IS-95, CDMA, GSM, TDMA, GPRS, EDGE, UMTSNVCDMA, TD-SCDMA, HSDPA, extensions thereto, and/or variants thereof. In this regard, the femtocells 110 may each communicate with cellular enabled communication devices such as the cellular enabled communication devices 112. Exemplary cellular standards supported by the femtocells 110 may be specified in the International Mobile Telecommunications-2000 (IMT-2000) standard and/or developed by the $3^{rd}$ generation partnership project (3GPP) and/or the $3^{rd}$ generation partnership project 2 (3GPP2).

The femtocells 110 may also each comprise suitable logic, circuitry, and/or code operable to transmit and/or receive data via a broadband sub-network 122. In this regard, the femtocells 110 may be operable to communicate utilizing non-cellular protocols such as Ethernet, DSL, and DVB.

Additionally, in some embodiments of the invention, the femtocells 110 may be operable to perform set-top-box functions. In this regard, each of the femtocells 110 may comprise suitable logic, circuitry, and/or code that may be operable to encrypt, decrypt, compress, decompress, encode, decode, transcode, present, scramble, descramble, or otherwise process multimedia content. Consequently, the femtocells 110 may each be operable to output multimedia content to one or more multimedia devices such as monitors, speakers, and/or storage devices via one or more multimedia connections.

Each of the femtocells 110 may also comprise suitable logic circuitry, and/or code that may be operable to support synchronization utilizing protocols such as those defined in IEEE 1588. In this regard, the femtocells 110 may each be operable to generate and/or receive synchronization messages and generate timestamps corresponding to the time instants at which it transmits and/or receives synchronization messages via cellular connections and/or non-cellular connections. Furthermore, each of the femtocells 110 may be operable to adjust its clock based on received and/or generated synchronization messages and/or timestamps.

The cellular enabled communication devices 112 may each comprise suitable logic, circuitry, and/or code that may be operable to communicate utilizing one or more cellular standards. In this regard, the cellular enabled communication devices 112 may each be operable to transmit and/or receive data via the communication system 100. Exemplary cellular enabled communication devices may comprise laptop computers, mobile phones, and personal media players. The cellular enabled communication devices 112 may be enabled to receive, process, and present multimedia content and may additionally be enabled run a web browser or other applications for providing Internet services to a user of the cellular enabled communication device 112. In various embodiments of the invention, any of the cellular enabled communication devices 112 may be operable to communicate their data processing and/or communication capabilities, preferences, and/or settings to any of the femtocells 110 with which they have established one or more cellular communications channels.

Additionally, in various embodiments of the invention, one or more of the cellular enabled communication devices 112 may be operable to support synchronization protocols such as IEEE 1588 and/or IEEE 802.1AS. In this regard, the cellular enabled communication devices 112 may each be operable to generate and/or receive synchronization messages and generate timestamps corresponding to the time instants at which it transmits and/or receives synchronization messages via cellular connections. Furthermore, each of the cellular enabled communication devices 112 may be operable to adjust its clock based on received and/or generated synchronization messages and/or timestamps.

In operation, a femtocell 110 may be operable to receive data from one or more networks such as the broadband sub-networks 122 via one or more non-cellular connections 120, transcode or otherwise process the received data, and transmit the transcoded data to one or more cellular enabled communication devices 112 via one or more cellular connections. Similarly, the femtocell 110, may be operable to receive data from one or more cellular enabled communication devices 112 via one or more cellular connections, transcode or otherwise process the received data, and transmit the transcoded data to one or more network such as the broadband sub-networks 122 via one or more non-cellular connections 120. To support communication of time-sensitive data between one or more cellular enabled communication devices 112 and one or more broadband sub-networks 122, the femtocell 110 may be operable to support synchronization of itself, one or more non-cellular network nodes 124 in one or more broadband sub-network 122, and one or more cellular enabled communication devices 112. In this regard, synchronization may be to a master clock, and the master clock may be a clock within a femtocell 110, a clock within a cellular enabled communication device 112, a clock within the base station 102, or a clock within a non-cellular network node 124 in a broadband sub-network 122. In one embodiment of the invention, the femtocell 110 may be synchronized to a global navigational satellite system (GNNS) clock signal.

In one exemplary embodiment of the invention, selection of a master clock for synchronization may be based on which of the devices being synchronized has the most accurate clock. Furthermore, one or more clocks within: one or more femtocells 110, one or more non-cellular network node in one or more broadband sub-network 122, and/or one or more cellular enabled communication devices 112 may be maintained via GNSS signals. Additionally and/or alternatively, other GNSS enabled devices such as satellites or assisted GNSS, for example AGPS servers, may be communicatively coupled to the communication system 100. Accordingly, a device having a clock maintained via the GNSS signal may be a preferred master device, where "master device" refers to the device comprising the selected master clock. Thus, the synchronized devices may all be synchronized to GNSS time. In instances that the femtocell 110b has a sufficiently accurate clock, such as a GNSS maintained clock, the femtocell 110*b* may be the default or preferred master device.

In another exemplary embodiment of the invention, there may be a plurality of cellular enabled communication devices from which to choose when selecting a master device and received GNSS signal strength and/or received cellular signal strength at a femtocell may be considered when selecting a master device. For example, the cellular enabled communication device 112 having the highest GNSS received signal strength, the cellular enabled communication device 112 having the highest cellular received signal strength at the femtocell, and/or the cellular enabled communication device 112 having the most optimal combination of GNSS received signals strength and cellular signal strength at the femtocell may be selected to be the master device. Accordingly, one or more femtocells, one or more non-cellular network nodes 124, and one or more cellular enabled communication devices may exchange messages comprising indications of received GNSS signals strength. In this manner, various devices in a communication system may determine received GNSS signal strength in other devices of the communication system.

In various exemplary embodiments of the invention, a master clock may be selected independent of clock accuracy. For example, the network 122*b* may be a service provider's network and the service provider may desire and/or configure the network 122*b* such that one of its devices, device 124 for example, is always chosen as the master device.

In various other embodiments of the invention, a master clock may be selected in a manner consistent with IEEE 802.1AS. In this regard, the master may be selected via the exchange of preference information utilizing a protocol similar to rapid spanning tree protocol Subsequent to synchronization, one or more datastreams may be communicated between a cellular enabled communication device 112 and a device in a broadband sub-network 122 with guaranteed quality of service. In this regard, resources in a femtocell 110 may be reserved for processing and/or communication of one or more particular datastreams and/or devices. In this regard, the femtocell 110 may support protocols such as the Audio Video Bridging (AVB) suite of protocols and related extensions. The individual protocols include, among others, IEEE P802.1AS—IEEE Standard for Local and Metropolitan Area Networks—Timing and Synchronization for Time-Sensitive Applications in Bridged Local Area Networks, IEEE P801.1Qat—IEEE Standard for Local and Metropolitan Area Networks: Virtual Bridged Local Area Networks—Amendment 9: Stream Reservation Protocol (SRP) and IEEE P802.1Qav: IEEE Standard for Local and Metropolitan Area Networks: Virtual Bridged Local Area Networks—Amendment 11: Forwarding and Queuing for Time-Sensitive Streams.

Figure 1B:
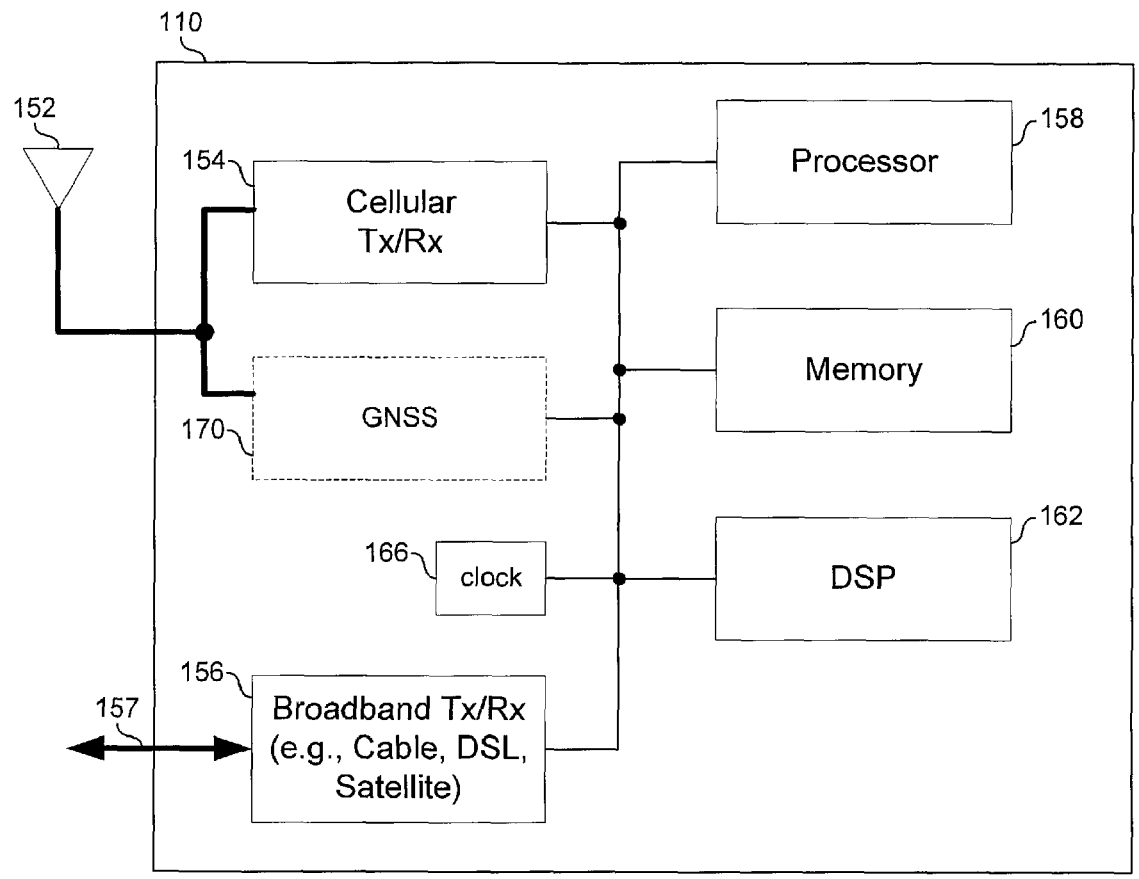
FIG. 1B is an exemplary block diagram of a femtocell, in accordance with an embodiment of the invention.

FIG. 1B is an exemplary block diagram of a femtocell, in accordance with an embodiment of the invention. Referring to FIG. 1B, the femtocell 110 may comprise an antenna 152, a cellular transmitter and/or receiver (Tx/Rx) 154, a broadband transmitter and/or receiver (Tx/Rx) 156, a processor 158, a memory 160, a digital signal processor (DSP) 162, a network connection 164, and a clock 166. In some embodiments of the invention, the femtocell 110 may comprise a GNSS receiver 170.

The antenna 152 may be suitable for transmitting and/or receiving cellular signals. Although a single antenna is illustrated, the invention is not so limited. In this regard, the cellular Tx/Rx 154 may utilize a common antenna for transmission and reception, may utilize different antennas for transmission and reception, and/or may utilize a plurality of antennas for transmission and/or reception. Similarly, in instances that the GNSS Rx 170 is present, the cellular Tx/Rx 154 and the GNSS Rx 170 may share one or more antennas or may utilize different antennas.

The cellular Tx/Rx 154 may comprise suitable logic circuitry and/or code that may be operable to transmit and/or receive voice and/or data utilizing one or more cellular standards. The cellular Tx/Rx 154 may be operable to perform amplification, down-conversion, filtering, demodulation, and analog to digital conversion of received cellular signals. The cellular Tx/Rx 154 may be operable to perform amplification, up-conversion, filtering, modulation, and digital to analog conversion of transmitted cellular signals. The cellular Tx/Rx 154 may support communication over a plurality of communication channels utilizing time division multiple access (TDMA) and/or code division multiple access (CDMA). Exemplary cellular standards supported by the femtocells 110 may be specified in the International Mobile Telecommunications-2000 (IMT-2000) standard and/or developed by the $3^{rd}$ generation partnership project (3GPP) and/or the $3^{rd}$ generation partnership project 2 (3GPP2). In various embodiments of the invention, the cellular Tx/Rx 154 may be operable to generate time stamps corresponding to time instants that it transmits messages or packets and time instants that it receives messages or packets.

The broadband Tx/Rx 156 may comprise suitable logic, circuitry, and/or code that may be operable to transmit voice and/or data in adherence to one or more broadband standards. The broadband Tx/Rx 156 may be operable to perform amplification, down-conversion, filtering, demodulation, and analog to digital conversion of received signals. The broadband Tx/Rx 156 may be operable to perform amplification, up-conversion, filtering, modulation, and digital to analog conversion of transmitted signals. In various exemplary embodiments of the invention, the broadband Tx/Rx 156 may transmit and/or receive voice and/or data over the link 157 which may be a T1/E1 line, passive optical network, DSL, cable television infrastructure, satellite broadband internet connection, satellite television infrastructure, and/or Ethernet. In various embodiments of the invention, the broadband Tx/Rx 156 may be operable to generate time stamps corresponding to time instants that it transmits messages and time instants that it receives messages.

The GNSS Rx 170 may comprise suitable logic, circuitry, and/or code that may be operable to receive and process signals from a GNSS system. Exemplary GNSS systems comprise the United State's global positioning system (GPS), Russia's GLONASS, and the European Union's Galileo. The GNSS Rx 170 may be operable to maintain the accuracy of the clock 166 based on received GNSS signals.

The clock 166 may comprise suitable logic, circuitry, and/or code that may be operable to generate and/or utilize one or more periodic signals to control synchronous operations and/or keep track of time. In various embodiments of the invention, the clock 166 may comprise one or more oscillators, phase locked loops, and/or direct digital frequency synthesizers. In various embodiments of the invention, the clock 166 may be utilized to synchronize and/or maintain operations of other portions of the femtocell 110. For example, content may be transmitted, decoded and/or presented based on the clock 166.

The processor 158 may comprise suitable logic, circuitry, and/or code that may enable processing data and/or controlling operations of the femtocell 110. With regard to processing data, the processor 158 may enable packetization, de-packetization, transcoding, reformatting, and/or otherwise processing data received from and/or to be transmitted by the cellular Tx/Rx 154 and/or from the broadband Tx/Rx 156.

With regard to controlling operations of the femtocell 110, the processor 158 may be enabled to provide control signals to the various other blocks comprising the femtocell 110. The processor 158 may also control data transfers between various portions of the femtocell 110. The processor 158 may enable execution of applications programs and/or code. In this regard, the applications, programs, and/or code may enable, for example, parsing, transcoding, or otherwise processing data. Furthermore, the applications, programs, and/or code may enable, for example, configuring or controlling operation of the cellular Tx/Rx 154, the broadband Tx/Rx 156, the DSP 162, and/or the memory 160. In various embodiments of the invention the processor 158 may be operable to process received timestamps and/or synchronization messages to calculate an offset for correcting the clock 166.

The memory 160 may comprise suitable logic, circuitry, and/or code that may enable storage or programming of information that includes parameters and/or code that may effectuate the operation of the femtocell 110. The parameters may comprise configuration data and the code may comprise operational code such as software and/or firmware, but the information need not be limited in this regard. Moreover, the parameters may include adaptive filter and/or block coefficients. Additionally, the memory 160 may buffer or otherwise store received data and/or data to be transmitted. In this regard, the memory 160 may enable packetization, de-packetization, transcoding, reformatting, and/or otherwise processing data received from and/or to be transmitted by the cellular Tx/Rx 154 and/or from the broadband Tx/Rx 156. In various embodiments of the invention, a size and/or one or more thresholds of one or more buffers in the memory 160 may be managed to support guaranteed quality of service for one or more datastreams which traverse the femtocell 110. For example, data belonging to a particular class of service such as a lower class of service may be buffered and/or dropped in favor of transmitting and/or receiving data belonging to another class of service such as higher class of service.

The DSP 162 may comprise suitable logic, circuitry, and/or code operable to perform computationally intensive processing of data. In various embodiments of the invention, the DSP 162 may encode, decode, modulate, demodulate, encrypt, decrypt, scramble, descramble, and/or otherwise process data. In various embodiments of the invention, the DSP 162 may be enabled adjust a modulation scheme, error coding scheme, and/or data rates of transmitted cellular signals data. In various embodiments of the invention the DSP 162 may be operable to process received timestamps and/or synchronization messages to calculate an offset between the clock 166 and a master clock.

In operation, the femtocell 110 may be operable to receive a synchronization message via the broadband Tx/Rx 156 and the broadband Tx/Rx may generate a timestamp corresponding to the time instant at which the synchronization message arrived. The femtocell 110 may be operable to transmit a synchronization message via the broadband Tx/Rx 156 and the broadband Tx/Rx 156 may generate a timestamp corresponding to the time instant at which the synchronization message was transmitted. The femtocell 110 may receive a synchronization message via the cellular Tx/Rx 154 and the cellular Tx/Rx 154 may generate a timestamp corresponding to a time instant at which the synchronization message arrived. The femtocell 110 may transmit a synchronization message via the cellular Tx/Rx 154 and the cellular Tx/Rx 154 may generate a timestamp corresponding to a time instant at which the synchronization message was transmitted.

Once synchronized, resources in the femtocell 110 may be allocated and/or reserved for handling traffic received from, or destined for, particular devices and/or packets belonging to particular datastreams. In this regard, resources such as processor time of the processor 158, processor time of the DSP 160, blocks of the memory 160, bandwidth of the cellular Tx/Rx 154, and/or bandwidth of the broadband 156 may be allocated and/or reserved.

Figure 2A:
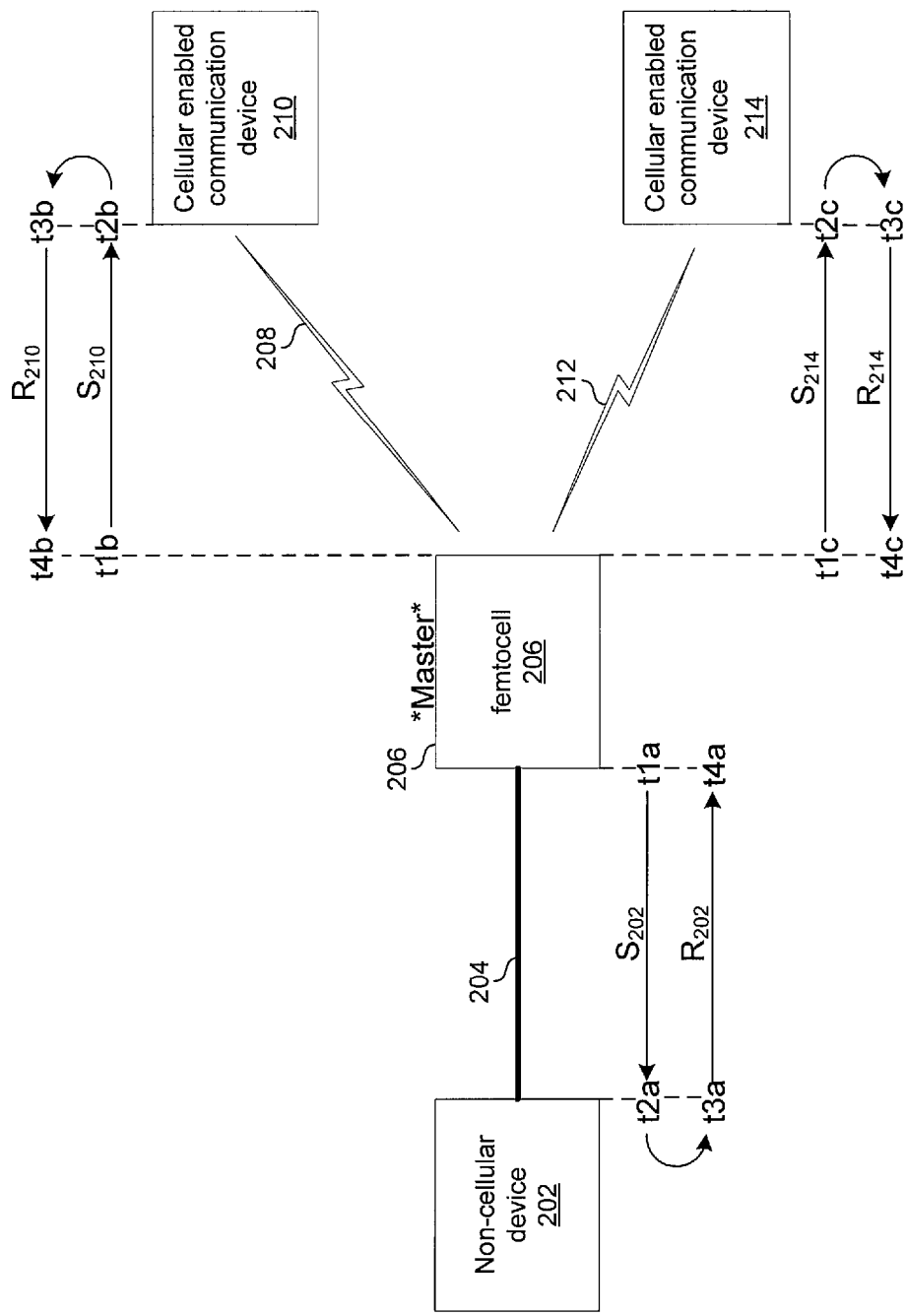
FIG. 2A is a diagram illustrating synchronization of a non-cellular network device, a femtocell, and a plurality of cellular enabled communication devices, where the femtocell is the master device for the synchronization, in accordance with an embodiment of the invention.
Figure 2B:
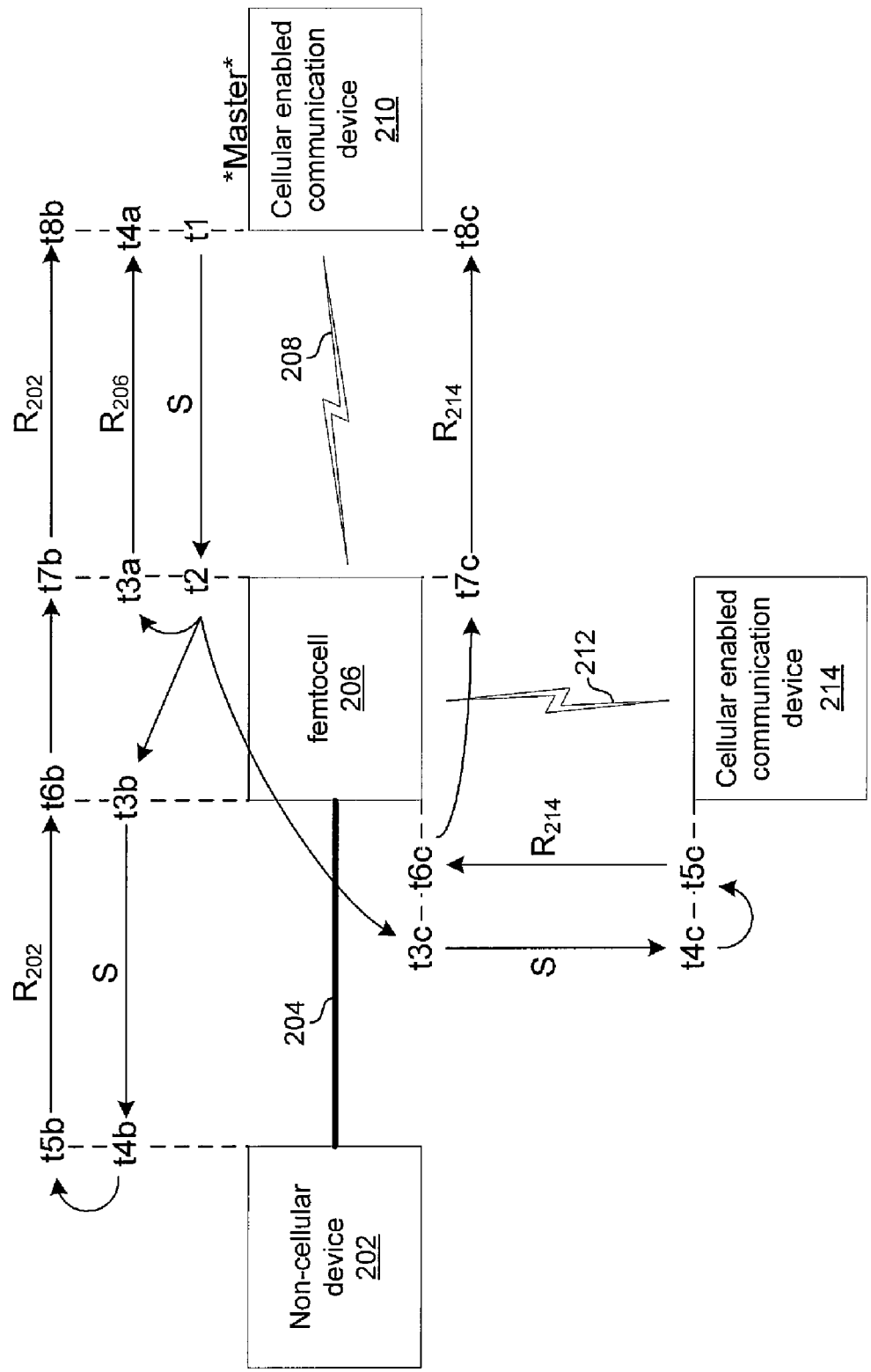
FIG. 2B is a diagram illustrating synchronization of a non-cellular network device, a femtocell, and a plurality of cellular enabled communication devices, where one of the cellular enabled communication device is the master device for the synchronization, in accordance with an embodiment of the invention.
Figure 2C:
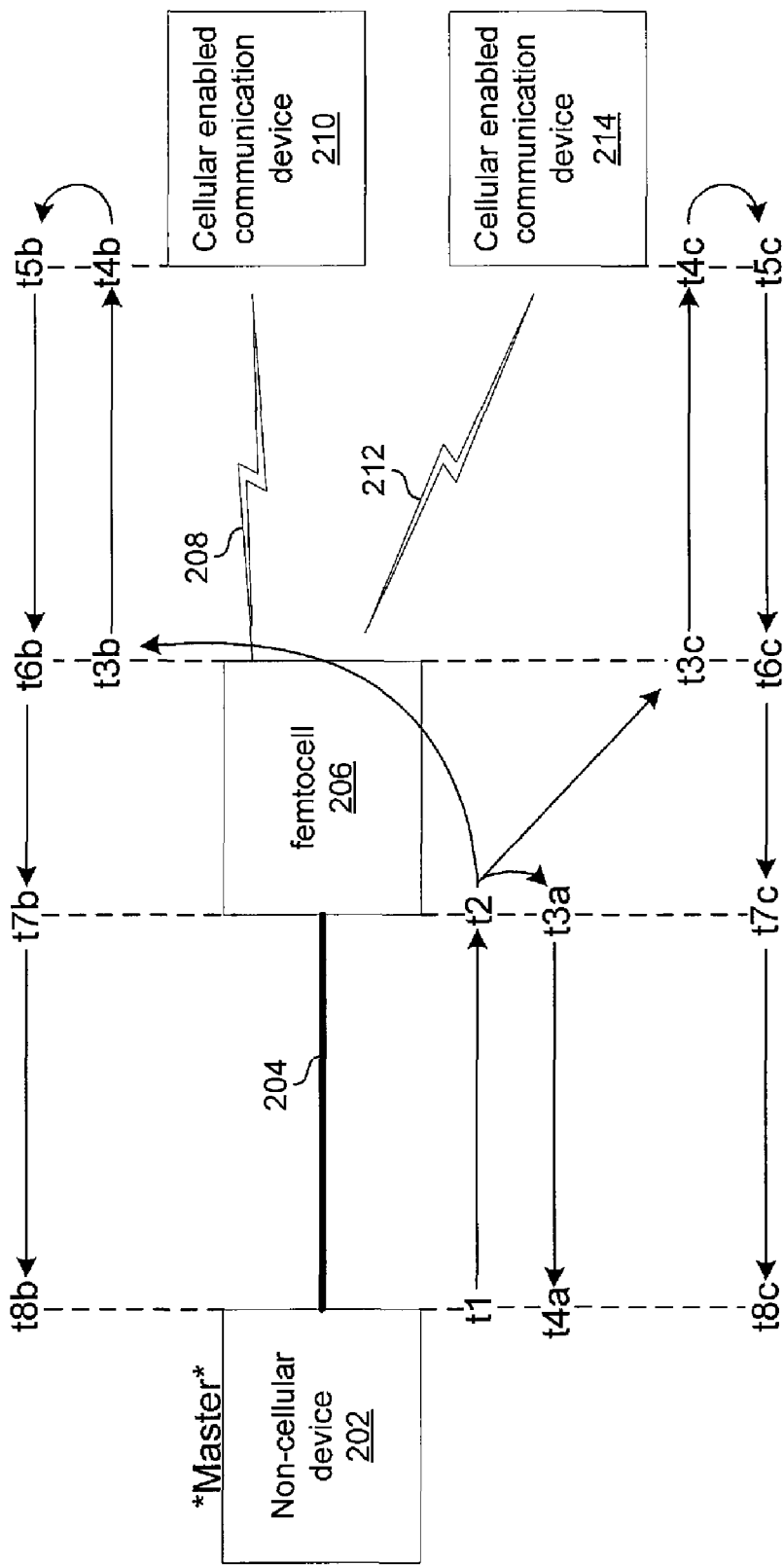
FIG. 2C is a diagram illustrating synchronization of a non-cellular network node a femtocell, and a plurality of cellular enabled communication devices, where the non-cellular network device is the master device for the synchronization, in accordance with an embodiment of the invention.

FIG. 2C is a diagram illustrating synchronization of a non-cellular network node, a femtocell, and a plurality of cellular enabled communication devices, where the non-cellular network node is the master device for the synchronization, in accordance with an embodiment of the invention. Referring to FIG. 2C, there is shown a non-cellular network node 202, a femtocell 206, and cellular enabled communication devices 210 and 214. The non-cellular network nod 202 may be communicatively coupled to the femtocell 206 via a non-cellular connection 204 and the femtocell 206 may be communicatively coupled to the cellular enabled communication devices 210 and 214 via cellular connections 208 and 212, respectively.

The non-cellular network node 202 may be a device in a broadband network, such as node 124 in the broadband subnetworks 122 described with respect to FIG. 1A. Exemplary devices may comprise servers, switches, routers, computers, and/or networking enabled appliances such as televisions. Exemplary communication protocols which may be utilized on the connection 204 comprise Ethernet, Wi-Fi, DSL, T1/E1, DVB, HDMI, and/or HDMI over Ethernet. In various embodiments of the invention, the non-cellular network node 202 may be the last network node traversed by multimedia content destined for the femtocell 208 and ultimately one or both of the cellular enabled communication devices 210 and 214.

The non-cellular connection 204 may comprise one or more optical, wired, and/or wireless links.

The femtocell 206 may be substantially similar to the femtocell 110 described with respect to FIGS. 1A and 1B.

The cellular enabled communication devices 210 and 214 may be substantially similar to the cellular enabled communication devices 112 described with respect to FIGS. 1A and 1B.

In operation, synchronization messages comprising synchronization request (SREQ) messages, TIME messages, and RESPONSE messages may be communicated the between the non-cellular device 202, the femtocell 206, and the cellular enabled communication devices 210 and 214. Timestamps may be generated at time instants corresponding to reception and transmission of the SREQ messages and RESPONSE messages. In the embodiment depicted in FIG. 2A, the femtocell 206 may be the master device for synchronization. Notwithstanding, the invention is not so limited and other devices may be operable to provide a master clock for synchronization.

At time instants t1$a$, t1$b$, and t1$c$, the femtocell 206 may be operable to transmit SREQ messages $S_{202}$, $S_{210}$, and $S_{214}$ via the non-cellular connection 204, the cellular connection 208, and the cellular connection 212, respectively. Upon transmission of the SREQ messages $S_{202}$, $S_{210}$, and $S_{214}$, the femtocell 206 may generate timestamps TS1$a$, TS1$b$, and TS1$c$ corresponding to time instants t1$a$, t1$b$, t1$c$, respectively. Shortly after time instant t1$a$, the femtocell 206 may transmit a TIME message TP1$a$ containing TS1$a$ via the non-cellular connection 204. Shortly after time instant t1$b$, the femtocell 206 may transmit a TIME message TP1$b$ containing TS1$b$ via the cellular connection 208. Shortly after time instant t1$b$, the femtocell 206 may transmit a TIME message TP1$c$ containing timestamp TS1$c$ via the cellular connection 212. In some embodiments of the invention, the femtocell 206 may be operable to simultaneously transmit the SREQ messages $S_{202}$, $S_{210}$, and $S_{214}$ and thus time instants t1a, t1b, and t1c may all be the same time instant.

At time instant t2a, the SREQ messages $S_{202}$ may be received by the non-cellular device 202 and the non-cellular device 202 may generate a corresponding timestamp TS2a. Shortly after time instant t2a, the non-cellular device 202 may receive TP1a. Additionally, the non-cellular device 202 may generate a RESPONSE message $R_{202}$ to be communicated back to the femtocell 206.

At time instant t3a, the non-cellular device 204 may transmit the response message $R_{202}$ via the non-cellular connection 204. Upon transmission of the response message $R_{202}$, the non-cellular device 202 may generate a timestamp TS3a, corresponding to time instant t3a. Shortly after time instant t3a, the non-cellular device 202 may transmit a TIME message TP3a containing timestamp TS3a via the non-cellular connection 204.

At time instant t4a, the RESPONSE message $R_{202}$ may be received by the femtocell 206 and the femtocell 206 may generate a corresponding timestamp TS4a. Shortly after time instant t4a, the femtocell 206 may receive TIME message TP3a and transmit a TIME message TP4a comprising timestamp TS4a to the non-cellular device 202.

Upon receiving TP4a, the non-cellular device 202 may know t1a, t2a, t3a, and t4a and may solve for the offset, $\Delta_{202}$, between its clock and the master clock in the femtocell 206 utilizing EQs. 1 and 2:

$$t2a-t1a=PD_{204}+\Delta_{202} \qquad \text{EQ. 1}$$

$$t4a-t3a=PD_{204}+\Delta_{202} \qquad \text{EQ. 2}$$

where $PD_{204}$ is the propagation delay of the non-cellular connection 204, which is assumed to be the same in both directions. Accordingly, the non-cellular device 202 may adjust its clock by $\Delta_{202}$ to synchronize it to the master clock.

Synchronization of the cellular devices 210 and 214 may proceed in a similar manner with synchronization messages being exchanged over the cellular connections 208 and 212. In this regard, the offset, $\Delta_{210}$, of the cellular device 210 may be calculated utilizing EQs. 3 and 4:

$$t2b-t1b=PD_{208}+\Delta_{210} \qquad \text{EQ. 3}$$

$$t4b-t3b=PD_{208}+\Delta_{210} \qquad \text{EQ. 4}$$

where $PD_{208}$ is the propagation delay of the cellular connection 208, which is assumed to be the same in both directions.

Similarly the offset, $\Delta_{214}$, of the cellular device 214 may be calculated utilizing EQs. 5 and 6:

$$t2c-t1c=PD_{212}+\Delta_{214} \qquad \text{EQ. 5}$$

$$t4c-t3c=PD_{212}+\Delta_{214} \qquad \text{EQ. 6}$$

where $PD_{212}$ is the propagation delay of the cellular connection 212, which is assumed to be the same in both directions.

FIG. 2B is a diagram illustrating synchronization of a non-cellular network device, a femtocell, and a plurality of cellular enabled communication devices, where one of the cellular enabled communication device is the master device for the synchronization, in accordance with an embodiment of the invention. Referring to FIG. 2B, the same devices are shown as in FIG. 2A, however, in FIG. 2B, the cellular enabled communication device 210 is the master device.

At time instant t1, the cellular enabled communication device 210 may transmit SREQ message S via the cellular connection 208. Upon transmission of the SREQ message S, the cellular enabled communication device 210 may generate timestamp TS1 corresponding to time instant t1. Shortly after time instant t1, the cellular enabled communication device 210 may transmit a TIME message TP1 comprising timestamp TS1 onto the connection 208.

At time instant t2, S may be received by the femtocell 206 and the femtocell 206 may generate a corresponding timestamp TS2. Shortly after time instant t2, the femtocell 206 may receive the TIME message TP1. Additionally, the femtocell 206 may generate a RESPONSE message $R_{206}$ to be communicated back to the cellular enabled communication device 210.

At time instant t3b, the femtocell 206 may forward the SREQ message S and the time message TP1 to the non-cellular device 202. In some embodiments of the invention, upon transmission of the SREQ message S via the non-cellular connection 204, the femtocell 206 may generate timestamp TS3b corresponding to time instant t3b. Additionally, in some embodiments of the invention, a TIME message TP2 comprising timestamp TS2 and/or a TIME message TP3b comprising timestamp TS3b may be transmitted to the non-cellular communication device 202.

At time instant t4b, S may be received by the non-cellular device 202 and the non-cellular device 202 may generate a corresponding timestamp TS4b. Shortly after time instant t4b, the non-cellular device 202 may receive the TIME message TP1, and, in some embodiments of the invention, the TIME message TP2 and/or TP3b. Additionally, the non-cellular device 202 may generate a RESPONSE message $R_{202}$ to be communicated back to the cellular enabled communication device 210 via the femtocell 206.

At time t5b the non-cellular device 202 may transmit the RESPONSE message $R_{202}$ via the non-cellular connection 204. Upon transmission of the RESPONSE message $R_{202}$, the non-cellular device 202 may generate a timestamp TS5b, corresponding to time instant t5b. Shortly after time instant t5b, the non-cellular device 202 may transmit a TIME message TP5b comprising timestamp TS5b via the non-cellular connection 204. In some embodiments of the invention, the non-cellular device may additionally transmit one or more of: TIME messages TP1, TP2, TP3b, and a TIME message TP4b comprising the timestamp TS4b via the non-cellular connection 204.

At time instant t6b, the RESPONSE message $R_{202}$ may be received by the femtocell 206 and may be followed shortly thereafter by the TIME message TP5b. In some embodiments of the invention, the femtocell 206 may generate a corresponding timestamp TS6b. Additionally, in some embodiments of the invention, the femtocell 206 may receive one or more of the TIME messages TP1, TP2, TP3b, and TP4b.

At time instant t7b, the femtocell 206 may forward the RESPONSE message $R_{202}$ and TIME message TP5b via the cellular connection 208. In some embodiments of the invention, the femtocell 206 may generate a corresponding timestamp TS7b. Additionally, in some embodiments of the invention, one or more of the TIME messages TP1, TP2, TP3b, TP4b, a TIME message TP6b comprising the timestamp TS6b, and a TIME message TP7b comprising the timestamp TS7b may be transmitted to the cellular enabled communication device 210.

In some embodiments of the invention, the femtocell 206 may additionally forward one or more of the TIME message TP1, TP2, TP3b, and TP4b via the cellular connection 208. In some embodiments of the invention, the femtocell 206 may transmit a TIME message TP6b comprising timestamp TS6b and/or a TIME message TP7b comprising the timestamp TS7b via the cellular connection 208.

At time instant t8b, the cellular device 210 may receive the RESPONSE message $R_{202}$ and may generate a corresponding timestamp TS8b. Shortly after time instant t8b, the cellular device 208 may receive the TIME message TP5b, and, in some embodiments of the invention, one or more of the TIME message TP1, TP2, TP3b, TP4b, TP6b, and TP7b. Shortly after time instant, the cellular device may forward TIME message TP8b to the non-cellular device 202. In some embodiments of the invention, the cellular enabled communication device 210 may additionally forward one or more of the TIME messages TP1, TP2, TP3b, TP4b, TP6b, and TP7b to the non-cellular device 202.

Upon receiving TP8a, the non-cellular device 202 knows, at a minimum, t1, t4b, t5b, and t8b and may solve for the offset, $\Delta_{202}$, between its clock and the master clock utilizing EQs. 7 and 8:

$$t4b - t1 = PD_{204+208} + \Delta_{202} \qquad \text{EQ. 7}$$

$$t8b - t5b = PD_{204+208} + \Delta_{202} \qquad \text{EQ. 8}$$

where $PD_{204+208}$ is the combined propagation delay between the cellular enabled device 210 and the non-cellular device 202, which is assumed to be the same in both directions. Accordingly, the non-cellular device 202 may adjust its clock by an offset $\Delta_{202}$ to synchronize it to the master clock in the cellular enabled communication device 210.

Synchronization of the femtocell 206 may proceed in a manner substantially similar to that described with respect to FIG. 2A. The offset, $\Delta_{206}$, between the clock in the femtocell 206 and the master clock may be determined utilizing EQs. 9 and 10:

$$t2 - t1 = PD_{208} + \Delta_{206} \qquad \text{EQ. 9}$$

$$t4a - t3a = PD_{208} + \Delta_{206} \qquad \text{EQ. 10}$$

where $PD_{208}$ is the propagation delay of the cellular connection 208, which is assumed to be the same in both directions. Accordingly, the femtocell 206 may adjust its clock by an offset $\Delta_{206}$ to synchronize it to the master clock in the cellular enabled communication device 210.

Synchronization of the cellular device 214 may proceed in a manner similar to synchronization of the non-cellular device 202. In this regard, at time instant t3c, the femtocell 206 may forward the SREQ message S to the cellular device 214 via the cellular connection 212. In some embodiments of the invention, the femtocell 206 may be operable to simultaneously forward the SREQ message S on the cellular connection 212 and the non-cellular connection 204, and thus t3b and t3c may be the same time instant. The offset, $\Delta_{214}$, between the clock in the cellular enabled communication device 214 and the master clock may be determined utilizing EQs. 11 and 12:

$$t4c - t1 = PD_{208+212} + \Delta_{214} \qquad \text{EQ. 11}$$

$$t8c - t5c = PD_{208+212} + \Delta_{214} \qquad \text{EQ. 12}$$

where $PD_{208+212}$ is the combined propagation delay between the cellular enabled device 210 and the cellular enabled communication device 214, which is assumed to be the same in both directions. Accordingly, the cellular enabled communication device 214 may adjust its clock by an offset $\Delta_{214}$ to synchronize it to the master clock in the cellular enabled communication device 210.

FIG. 2C is a diagram illustrating synchronization of a non-cellular network node, a femtocell, and a plurality of cellular enabled communication devices, where the non-cellular network device is the master device for the synchronization, in accordance with an embodiment of the invention. Referring to FIG. 2C, synchronization may proceed in a manner substantially similar to that described with respect to FIG. 2A and/or FIG. 2B.

Figure 3:
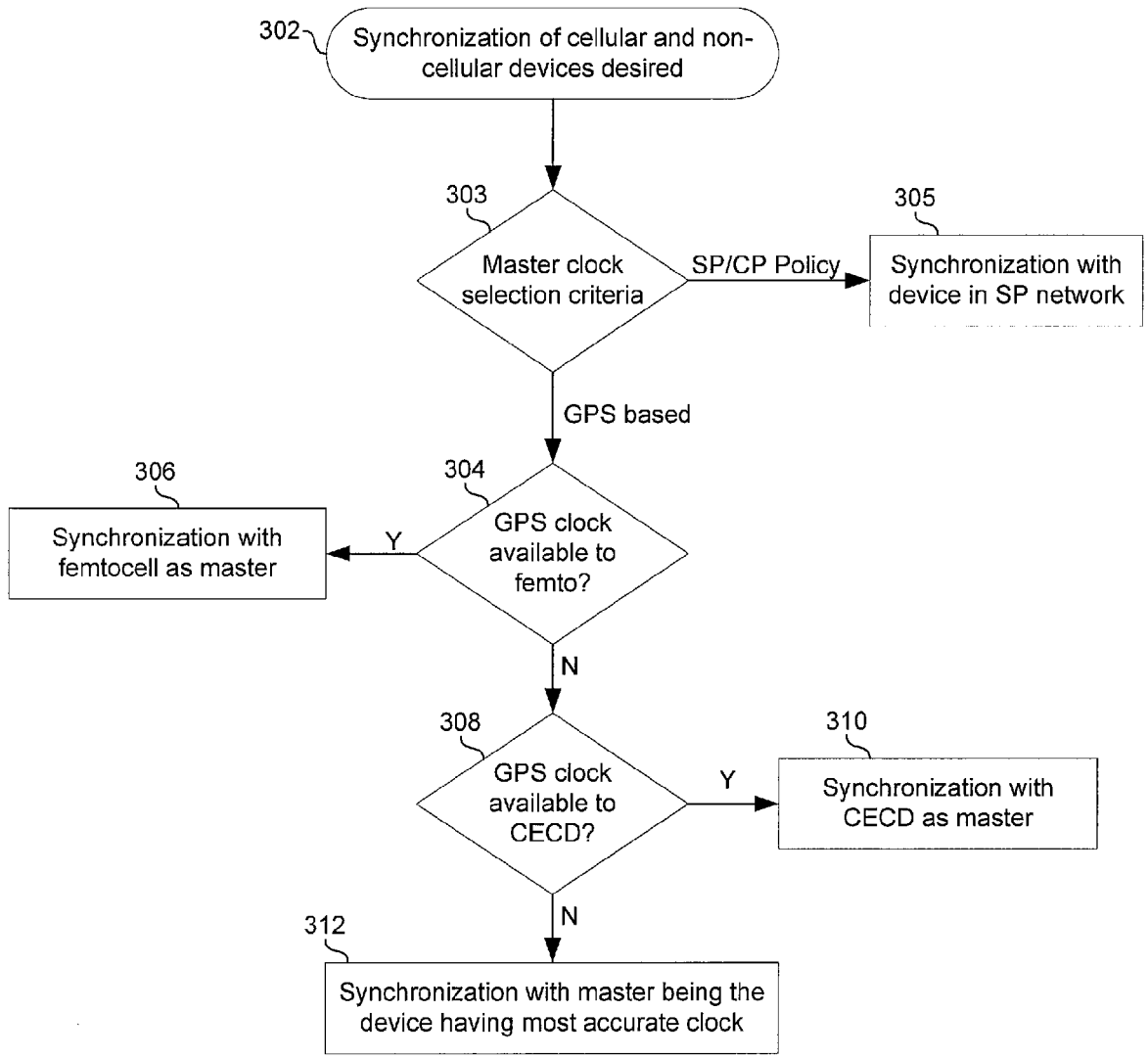
FIG. 3 is a flow chart illustrating exemplary steps for synchronizing cellular and non-cellular devices via a femtocell, in accordance with an embodiment of the invention.

FIG. 3 is a flow chart illustrating exemplary steps for synchronizing cellular and non-cellular devices via a femtocell, in accordance with an embodiment of the invention. Referring to FIG. 3, the exemplary steps may begin with step 302 when it may be desired and/or necessary to synchronize a femtocell, one or more cellular enabled communication devices communicatively coupled to the femtocell, and one or more non-cellular devices communicatively coupled to the femtocell. Subsequent to step 302, the exemplary steps may advance to step 303.

In step 303, criteria for selecting a master device may be determined. In two exemplary embodiments of the invention, the master clock may be selected based on a service provider policy or based on a GPS clock. For the former, the exemplary steps may advance to step 303, for the latter the exemplary steps may advance to step 304.

In step 303, the master clock may be selected based on a policy of a service provider (SP) or a content provider (CP). For example, the node 202 of FIGS. 2A-2C may be a server in a SP or CP network and the SP or CP may desire the node 202 to be the master when serving content to the femtocell 206.

In step 304, received signal strength of GNSS signals in the femtocell may be determined. In instances that GNSS received signal strength in the femtocell is above a threshold, the exemplary steps may advance to step 306.

In step 306, synchronization may proceed with the femtocell acting as the master device. In this regard, synchronization may proceed as described with respect to FIG. 2A.

Returning to step 304, in instances that GNSS received signal strength in the femtocell is below a threshold, the exemplary steps may advance to step 308.

In step 308, received signal strength of GNSS signals in a cellular enabled communication device communicatively coupled to the femtocell may be determined. In instances that GNSS received signal strength in the cellular enabled communication device (CECD) is above a threshold, the exemplary steps may advance to step 310.

In step 310, synchronization may proceed with the cellular enabled communication device acting as the master device. In this regard, synchronization may proceed as described with respect to, for example, FIG. 2B.

Returning to step 308, in instances that GNSS received signal strength in the cellular enabled communication device is below a threshold, the exemplary steps may advance to step 312.

In step 312, a master device for synchronization may be chosen to be the device which has the most accurate clock. For example, the master clock may be chosen to be the clock that has less drift and/or jitter than the other clocks, as determined by specification of the devices. In this regard, a default master device may be configured by a network administrator. Alternatively, clock parameters may be stored in each of the devices and they may be operable to communicate those parameters to the other devices.

Figure 4:
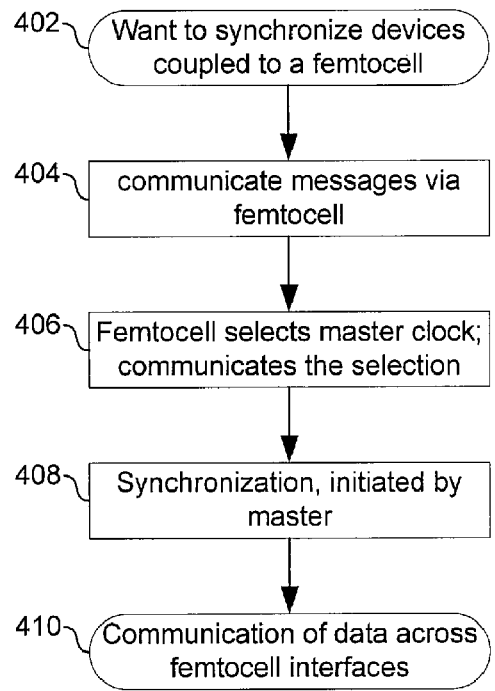
FIG. 4 is a flowchart illustrating exemplary steps for selecting a master clock and synchronizing to the master clock, via a femtocell.

FIG. 4 is a flowchart illustrating exemplary steps for selecting a master clock and synchronizing to the master clock, via a femtocell. Referring to FIG. 4, the exemplary steps may begin with step 402 when it is desired to synchronize cellular and non-cellular devices communicatively coupled to a femtocell. Subsequent to step 402, the exemplary steps may advance to step 404.

In step 404, the cellular and non-cellular devices may communicate messages to the femtocell to enable selection of a master clock. In this regard, the messages may comprise, for example, GNSS received signals strength, parameters, such as jitter and drift, of clocks within the devices, and cellular signal strength between the cellular devices and the femtocell. Subsequent to step 404, the exemplary steps may advance to step 406.

In step 406, the femtocell may process the messages received in step 404 to select a master clock. For example, the femtocell may select the device that has the strongest GNSS reception and/or the device that has the clock with the least jitter, skew or drift, and/or the clock having greatest accuracy. After selecting the master clock, the femtocell may communicate an indication of the selected master clock to the devices to which it is communicatively coupled. Subsequent to step 406, the exemplary steps may advance to step 408.

In step 408, the master device comprising the selected master clock may initiate synchronization and an exchange of synchronization request messages or packets, response messages or packets, and time messages of packets may be carried out to enable the devices to determine an offset between their clocks and the master clock, and adjust their clocks accordingly. Subsequent to step 408, the exemplary steps may advance to step 410.

In step 410, time sensitive data may be communicated between the cellular enabled communication devices and the non-cellular network nodes via the femtocell. In this manner, cellular enabled communication devices may be provided with guaranteed quality of service for some datastreams and/or data sources. For example, a particular QoS may provide communication of data at a requested or specified bit rate desired by a user.

Aspects of a method and system for network synchronization via a femtocell are provided. In an exemplary embodiment of the invention, a femtocell 110b (FIG. 1A) may receive one or more messages from a plurality of different sources comprising one or more other femtocells 110a, 110c, and 110d (FIG. 1A), one or more cellular enabled communication devices 112, and one or more non-cellular network nodes 124 (FIG. 1A). The femtocell 110b may select, based on the received messages, a master clock within one of the plurality of different sources as a master clock for synchronization of the plurality of different sources 110a, 110c, 110d 112, and 124.

One or more of the femtocell 110b and the plurality of different sources 110a, 110c, 110d 112, and 124 may be operable to receive GNSS signals, or one or more GNSS devices may be communicatively coupled to femtocell 110b and/or one or more of the plurality of different sources 110, 112, 124. The femtocell 110b may communicate an indication of the selected master clock to the other femtocells 110, the one or more cellular enabled communication devices 112, and/or the one or more non-cellular network nodes 124. A femtocell clock 166 (FIG. 1B), a global navigational satellite signal (GNSS) clock, a cellular base station clock, or a cellular enabled communication device clock may be selected as the master clock. The received messages may comprise an indication of received GNSS signals strength of the femtocell 110b, the one or more cellular enabled communication devices 112, and the one or more non-cellular network nodes 124. The master clock may be selected based on received GNSS signal strength. A clock 166 within the femtocell 110b may be selected to be the master clock when received signal strength of GNSS signals in the femtocell 110b is above a threshold. A clock within the cellular enabled communication device 112c may be selected to be the master clock when a received signal strength of the GNSS signals the femtocell 110b and the other femtocells 110a, 110c, and 110d is below a threshold and a received signal strength of the GNSS signals in the cellular enabled communication device 112a is above threshold.

The master clock may be selected based on clock jitter, clock skew, clock accuracy, and/or clock drift. A clock in cellular enabled communication device 112c may be selected as the master clock based on received signal strength in the femtocell 110b from the cellular enabled communication device 112c compared to received signal strengths from other cellular enabled communication devices 112. In an exemplary embodiment of the invention, a clock 166 within the femtocell 110b may be selected as the master clock and the femtocell 110b may subsequently transmit synchronization request messages simultaneously, or nearly simultaneously, to the one or more cellular enabled communication devices 112 and to the one or more non-cellular network nodes 124. The femtocell 110b may transmit and/or receive synchronization messages to and/or from the one or more cellular enabled communication devices 112 and the one or more non-cellular network nodes 124. A synchronization message may comprise a timestamp generated by the femtocell 110b and the timestamp may correspond to a time instant at which the synchronization message was transmitted or received by the femtocell 110b.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for network synchronization via a femtocell.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. In a communication system comprising one or more Global Navigational Satellite Signal (GNSS) devices, one or more femtocells, one or more mobile cellular enabled communication devices, and one or more non-cellular network nodes, a method comprising:
   receiving, by one of said one or more femtocells, messages from a plurality of different sources comprising remaining ones of said one or more femtocells, said one or more mobile cellular enabled communication devices, and said one or more non-cellular network nodes,
   wherein said received messages comprise an indication of received GNSS signal strength of said remaining one or more femtocells, said one or more mobile cellular enabled communication devices, and said one or more non-cellular network nodes; and
   selecting, by said one of said one or more femtocells, based on said received messages, a clock within one of said plurality of different sources as a master clock for synchronization of said plurality of different sources.

2. The method according to claim 1, comprising communicating an indication of said selected master clock to at least one of said remaining ones of said one or more femtocells, said one or more mobile cellular enabled communication devices, and said one or more non-cellular network nodes.

3. The method according to claim 1, comprising selecting one of a femtocell clock, a GNSS clock, a cellular base station clock, a non-cellular network node clock, and a mobile cellular enabled communication device clock as said master clock.

4. The method according to claim 1, comprising selecting said master clock based on said indication of said received GNSS signal strength.

5. The method according to claim 1, comprising selecting a clock within said one of said one or more femtocells to be said master clock when received GNSS signal strength in said one of said one or more femtocells is above a threshold.

6. The method according to claim 1, comprising selecting a clock within one of said mobile cellular enabled communication devices to be said master clock wherein:
   said received GNSS signal strength in remaining ones of said plurality of different sources and in said one of said one or more femtocells is below a threshold; and
   said received GNSS signal strength in said one of said mobile cellular enabled communication devices is above said threshold.

7. The method according to claim 1, comprising selecting said master clock based on at least one of clock jitter, clock skew, clock accuracy, and clock drift.

8. The method according to claim 1, comprising selecting a clock in one of said one or more of mobile cellular enabled communication devices as said master clock based on received signal strength in said one of said one or more femtocells from each of said one or more mobile cellular enabled communication devices.

9. The method according to claim 1, comprising:
   selecting a clock within said one of said one or more femtocells as said master clock; and
   transmitting, by said one of said one or more femtocells, synchronization request messages simultaneously, within a tolerance, to said one or more mobile cellular enabled communication devices and to said one or more non-cellular network nodes.

10. The method according to claim 1, comprising at least one of transmitting and receiving, by said one of said one or more femtocells, at least one of synchronization messages to and from said one or more mobile cellular enabled communication devices and said one or more non-cellular network nodes, wherein:
   a synchronization message comprises a timestamp generated by said one of said one or more femtocells; and
   said timestamp corresponds to a time at which said synchronization message was transmitted or received by said one of said one or more femtocells.

11. A system for communication, the system comprising:
   one or more Global Navigational Satellite Signal (GNSS) devices, and one or more circuits for use in a femtocell, wherein said one or more circuits are operable to:
   receive messages from a plurality of different sources comprising one or more other femtocells, one or more mobile cellular enabled communication devices, and one or more non-cellular network nodes,
   wherein said received messages comprise an indication of received GNSS signal strength of said one or more other femtocells said one or more mobile cellular enabled communication devices, and said one or more non-cellular network nodes; and
   select, based on said received messages, a clock within one of said plurality of different sources as a master clock for synchronization of said plurality of different sources.

12. The system according to claim 11, wherein said one or more circuits are operable to communicate an indication of said selected master clock to at least one of said one or more other femtocells, said one or more mobile cellular enabled communication devices, and said one or more non-cellular network nodes.

13. The system according to claim 11, wherein said one or more circuits are operable to select one of a femtocell clock, a GNSS clock, a cellular base station clock, a non-cellular network node clock, and a mobile cellular enabled communication device clock as said master clock.

14. The system according to claim 11, wherein said one or more circuits are operable to select said master clock based on said indications of said received GNSS signal strength.

15. The system according to claim 11, wherein said one or more circuits are operable to select a clock within said femtocell to be said master clock when received GNSS signal strength in said femtocell is above a threshold.

16. The system according to claim 11, wherein said one or more circuits are operable to select a clock within one of said mobile cellular enabled communication devices to be said master clock wherein:
   said received GNSS signal strength in remaining ones of said plurality of different sources and in said femtocell are below a threshold; and
   said received GNSS signal strength in said one of said mobile cellular enabled communication devices is above said threshold.

17. The system according to claim 11, wherein said one or more circuits are operable to select said master clock based on at least one of clock jitter, clock skew, clock accuracy, and clock drift.

18. The system according to claim 11, wherein said one or more circuits are operable to select a clock in one of said one or more of mobile cellular enabled communication devices as said master clock based on received signal strength in said femtocell from each of said one or more mobile cellular enabled communication devices.

19. The system according to claim 11, wherein said one or more circuits are operable to:
   select a clock within said femtocell or said one or more other femtocells as said master clock; and transmit synchronization request messages simultaneously, within a tolerance, to said one or more mobile cellular enabled communication devices and to said one or more non-cellular network nodes.

20. The system according to claim 11, wherein said one or more circuits are operable to perform at least one of transmit and receive synchronization messages and at least one of to and from said one or more mobile cellular enabled communication devices and said one or more non-cellular network nodes, wherein:
   a synchronization message comprises a timestamp generated by said femtocell; and
   said timestamp corresponds to a time at which said synchronization message was transmitted or received by said femtocell.

* * * * *

UNITED STATES PATENT AND TRADEMARK OFFICE
CERTIFICATE OF CORRECTION

| | | |
|---|---|---|
| PATENT NO. | : 8,305,955 B2 | Page 1 of 1 |
| APPLICATION NO. | : 12/395470 | |
| DATED | : November 6, 2012 | |
| INVENTOR(S) | : Diab et al. | |

It is certified that error appears in the above-identified patent and that said Letters Patent is hereby corrected as shown below:

Column 18
Line 20, Claim 11, please replace "femtocells said one" with --femtocells, said one--.

Signed and Sealed this
Fifth Day of February, 2013

Teresa Stanek Rea
*Acting Director of the United States Patent and Trademark Office*